Figure 1:
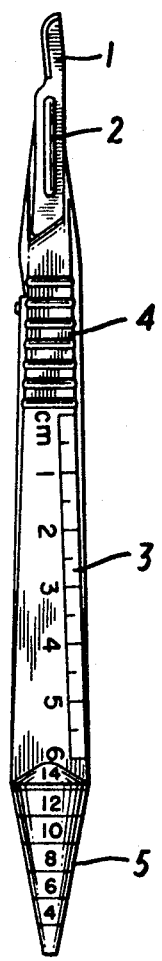

United States Patent [19]

Rubricuis

[11] 3,740,779
[45] June 26, 1973

[54] SURGICAL DEVICE
[75] Inventor: Jeanette L. Rubricuis, Brooklyn, N.Y.
[73] Assignee: Harry H. Leveen, Brooklyn, N.Y.
[22] Filed: Nov. 26, 1971
[21] Appl. No.: 202,294

[52] U.S. Cl............ 7/14.1 R, 7/1 M, 7/1 B, 128/303 R, 128/25, 128/305, 33/143 C, 33/174 D, 33/178 B
[51] Int. Cl............ B25f 1/04, A61b 17/00
[58] Field of Search............ 7/1 M, 1 B, 1 R, 7/5.1, 4, 14.1 R; 128/25, 305, 303 R; 33/143 C, 174 D, 107 R, 148 E, 178 B, 152 R

[56] References Cited
UNITED STATES PATENTS

| 898,565 | 9/1908 | Duncan | 33/148 E |
|---|---|---|---|
| 1,099,567 | 6/1914 | Neukirchen | 33/152 R |
| 1,243,343 | 10/1917 | Roberts | 33/148 E |
| 569,038 | 10/1896 | Dow | 7/1 B |
| 598,225 | 2/1898 | Herrim | 7/1 B |
| 1,601,740 | 10/1926 | Kurzer | 7/1 B |
| 1,539,040 | 5/1925 | Bocchino | 33/148 E |
| 3,094,124 | 6/1963 | Britwell | 128/348 |
| 3,400,479 | 9/1968 | Anderson et al. | 128/330 |

FOREIGN PATENTS OR APPLICATIONS

| 788,247 | 6/1968 | Canada | 128/305 |
|---|---|---|---|
| 799,830 | 8/1958 | Great Britain | 33/178 B |

Primary Examiner—Granville Y. Custer, Jr.
Assistant Examiner—Roscoe V. Parker
Attorney— Patrick J. Joyce, Robert E. Burns et al.

[57] ABSTRACT

A surgical tool which comprises a surgical scalpel containing on one end thereof a scalpel blade. On the shaft thereof a series of metered markings for the purpose of longitudinal measurement and on the other end of the shaft a device for measuring the circumferential diameter of an orifice or mouth of a tube or duct.

9 Claims, 2 Drawing Figures

PATENTED JUN 26 1973 3,740,779

SURGICAL DEVICE

BACKGROUND OF THE INVENTION

Frequently, during the course of a surgical operation or procedure it is imperative for the surgeon to ascertain the approximate dimensions of a tubular structure such as an artery. This measurement becomes particularly important when this structure has been severed by means of a surgical scalpel as a first step in replacement of a segment of the tubular structure which is diseased. As a second step in the surgical procedure, a tubular prosthetic device of proper cross sectional diameter is sutured to the severed end of the tube as well as into a second cut end which becomes available after a second surgical incision made with a scalpel. During the interval between the initial cleavage of the tube and the second excision the dimensions of the repair unit must be quickly and rapidly ascertained by the surgeon and intelligently communicated in reproducable values to his assistant who procures the correct tissue, plastic or other repair segment in the proper length and circumferencial diameter for a joinder with the cut end of the tubular stucture which is undergoing repair.

In the past, it has been the practice for the surgeon to estimate the length or diameter of a duct and to improvise a means of filling the gap by trial and error from a selection of prostetic devices including tubes and tissue transplants which must be sterilized along with the means for their measurement.

It is an object of this invention therefore to remove such need for trial and error estimations and to make available a cutting instrument which has the means for immediate measurement by a sterile tool already in use in the operation for metering prostetic devices to be inserted or recording of size of vessels or other organs.

BRIEF DESCRIPTION OF THE INVENTION

The surgical tool of the present invention provides in one instrument a means for making the initial severence of a damaged tube, the means for the immediate measurement of length of the damaged tube which must be removed and a means for ascertainment of the correct and accurate inside diameter of the tube so that a proper fit may be made with a repair tube to be inserted before or after the second incision has been made into the damaged tube so that the damaged or diseased segment may be entirely removed.

The methodical significance of this improvement in operative technique may be appreciated by reference to a specific resection and repair of an aneurysm of a large blood vessel. The artery in question is first doubly cross clamped in two different areas, one proximal and the other distal to the aneurysm. The vessel is then transected between the proximal two clamps with the blade of the scalpel. The cross-sectional diameter of the vessel is then measured. The vessel is then transected between the two clamps which have been placed distal to the aneurysm, and the cross-sectional diameter is measured at this point. The aneurysm of the blood vessel is then excised and the defect created by this excision is measured. A prosthetic device of the proper diameter is then procured and attached to the upper and lower end of the defect by suturing. After a woven prosthesis has been sutured into place, the clamps remaining on the artery are removed and the blood circulation is again restored.

Figure 2:
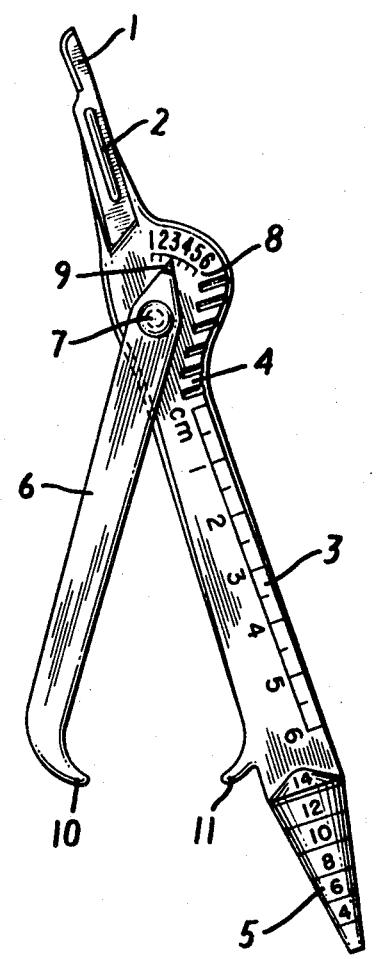

The preferred mode of use of the surgical instrument and the details of its construction and design will be more specifically pointed out by reference to the several accompanying FIGS. 1 and 2 of the drawing.

FIG. 1 of the drawing is a plan view of the surgical instrument. FIG. 2 is also a plan view of an alternative device which also contains a means for measure of the outside dimensions of an organ or tube.

Accordingly, referring to FIG. 1 of the drawing, there can be seen a surgical tool mode entirely of stainless steel or other metal and having a scalpel cutting blade 1 affixed to the shaft 4 of the tool by means of a snap clamp 2 or other suitable means. Over the middle segment of the shaft 4 there are series of length unit measurement marks 3 which can be in either centimeters or inches or both. At the end of the shaft opposite the cutting blade 1 there is positioned a cone shaped meter 5 adapted to measure the internal circumference of tubular stuctures found throughout the body. An alternative device is illustrated by reference to FIG. 2 of the drawing wherein an additional arm 6 is attached to shaft 4 through pivot pin 7 so as to move or swing out therefrom serve as a caliper and by contact of points 10 and 11 with the external wall of a tube or organ to be measured it is possible to transmit its outer measurement or size through a gauge 9 into a dial or scale 8 which indicates the relative value thereof as well.

Although this tool can be fabricated entirely of metal as aforementioned, the numerals on the shaft 4 makes the scale 3 and the scale 5 most difficult to see. Also, scale 8 on shaft 4 in FIG. 2 is small and cannot be easily read if contructed entirely of metal. In addition, the cone 5 at the end of shaft 4 in both figures make the weight of the handle uncomfortable since the scalpel tends to become top heavy and is difficult to use. There are some unusual properties of plastic which make it the ideal handle or shaft for the steel blade 1. It is light and does not become top heavy. It can be easily injection molded and therefore it is possible to have a handle which can be used for one time use and presterilized along with the blade. The numbers on the plastic blade can be hot stamped in a bright color or metalized appearance and the blade handle can be colored or pigmented. The ability of the blade handle to be pigmented makes it possible to color code scalpel sizes so that different blades can be easily identified. These unusual features of plastic make this form of the invention most useful.

Bearing in mind the structure just described, some brief recitals of the preferred modes of use for the device may be made. Others will be immediately apparent to those skilled in the art of surgery. In the course of surgery for obstructive jaundice, it is often desired to drain the common bile duct. The common bile duct is opened by a longitudianl incision in its wall. The opened common bile duct is then measured with the conical end of the scalpel blade so that a rubber or soft plastic catheter of suitable cross-sectional diameter can be introduced into the common duct proximally in such a manner that there is a snug fit without leakage of bile. In the resection of an aneurysm before mentioned, the cut ends of the blood vessel can be measured with the caliper or the cone so that the proper sized prosthesis can be chosen. It is also possible to measure the length of the defect on the blade handle so that the prosthesis can be cut to the proper length. When the proper sized prothesis is fully sewn into place, the blood circulation can be restored. Any instrument which facilitates the tailoring of the prosthetic device to the remaining structures is an important time saver and may make the difference between survival or death of an organ whose blood supply has been interrupted. In tailoring a ureter to the pelvis of the kidney when it is necessary to excise a segment of the ureter or pelvis such as in renal transplantation, the exact opening of the kidney pelvis can be measured with the rule on the blade handle. A longitudinal slit of the proper length can then be made in the ureter corresponding to the opening in the pelvis to which the ureter is to be anastomosed.

Referring to FIG. 2 of the drawing, a recordable measurement may be made of a tumor by having its external diameter measured by means of and being placed between the arms 10 and 11 of the caliper which function to make this measure of the external dimensions possible by the location therebetween while swing of the arm 6 registers this data on the face of the dial 8 by means of the gauge 9. Such locations and measurements may be important in X-Ray therapy which is given subsequent to surgery.

Since there are many variations of the device which may occur to those skilled in the art, the present specification and drawings disclose sufficient information to support those claims which are set forth and appended hereto. The proper scope of the concept of this invention therefore can only be measured by reference to the several claims set forth herein.

What is claimed is:

1. A surgical tool which comprises a rigid shaft having affixed to one end a cutting blade, said shaft having unit measurement marks extending over the middle segment thereof and tapered and metered tip on the end opposite the cutting blade, said tapered tip adapted to measure the internal diameter of tubular stuctures in the body.

2. A surgical tool as described in claim 1, wherein the shaft unit is constructed of a thermoplastic.

3. A surgical tool as described in claim 1 wherein the thermoplastic is color coded to the size and shape of the cutting blade.

4. A surgical tool as described in claim 2 wherein the thermoplastic is polypropylene.

5. A surgical tool as described in claim 3, wherein the unit measurement marks are printed in a contrasting color.

6. A surgical tool as described in claim 1, having an articulated side arm which serves as a caliper, said caliper having a pointer element which points to a scale having measurement marks.

7. A surgical tool as described in claim 6, wherein the plastic is polypropylene.

8. A surgical tool as described in claim 6 wherein the plastic is color coded to the size and shape of the cutting blade.

9. A surgical tool as described in claim 8, wherein the unit markings are printed in a color contrasting with the color of the shaft.

* * * * *